US012278064B2

(12) United States Patent
Hsu

(10) Patent No.: US 12,278,064 B2
(45) Date of Patent: Apr. 15, 2025

(54) REGULATING SWITCH

(71) Applicant: Dong Guan Jia Sheng Lighting Technology Co., Ltd. China, Dong-Guna (CN)

(72) Inventor: Kevin Hsu, Taichung (TW)

(73) Assignee: Dong Guan Jia Sheng Lighting Technology Co., Ltd. China, Dong-Guna (CN)

( * ) Notice: Subject to any disclaimer, the term of this patent is extended or adjusted under 35 U.S.C. 154(b) by 41 days.

(21) Appl. No.: 18/455,274

(22) Filed: Aug. 24, 2023

(65) Prior Publication Data

US 2025/0069829 A1 Feb. 27, 2025

(51) Int. Cl.
*H01H 19/20* (2006.01)
*H01H 19/14* (2006.01)

(52) U.S. Cl.
CPC ............ *H01H 19/20* (2013.01); *H01H 19/14* (2013.01)

(58) Field of Classification Search
CPC ........ H01H 19/00; H01H 19/02; H01H 19/08; H01H 19/14; H01H 19/20; H01H 19/60; H01H 19/62; H01H 3/08; H01H 3/10; H01H 2003/028; H01H 2003/08; H01H 2003/10; H01H 2221/00; H01H 2221/01; H01H 2221/024
USPC .......................................................... 200/336
See application file for complete search history.

(56) References Cited

U.S. PATENT DOCUMENTS 9,673,001 B2 * 6/2017 Ho ......................... H01H 19/08

* cited by examiner

*Primary Examiner* — Anthony R Jimenez
(74) *Attorney, Agent, or Firm* — Chun-Ming Shih; LANWAY IPR SERVICES

(57) ABSTRACT

A regulating switch includes a first regulating rod, a second regulating rod, a base, multiple first elastic plates, multiple second elastic plates, a first variable resistor, and a second variable resistor. The first regulating rod includes a first regulating portion and a first driving portion. The first regulating rod is coaxial with and extends through the second regulating rod. The second regulating rod includes a second regulating portion and a second driving portion. The first variable resistor is connected with the first driving portion. The second variable resistor is connected with the second driving portion. The first elastic plates rest on the first driving portion and/or rest on the first variable resistor. The second elastic plates rest on the second driving portion and/or rest on the second variable resistor.

10 Claims, 6 Drawing Sheets

REGULATING SWITCH

BACKGROUND OF THE INVENTION

Field of the Invention

The present invention relates to a switch device and, more particularly, to a regulating switch or an adjusting switch.

Description of the Related Art

A conventional axially arranged regulating switch is operated and rotated to turn on/off a lighting device or lamp. The conventional regulating switch performs a regulating function by axial rotation and pressing. However, the conventional regulating switch only has a single regulating function. The lighting device often needs to regulate multiple lighting parameters, including light intensity, color temperature or the like. Thus, it is necessary to provide multiple switches so as to satisfy multiple regulating requirements, so that the regulating procedures are complicated, thereby causing inconvenience to the user when having to regulate the switches. In addition, it is necessary to expand more space for accommodating the multiple switches.

BRIEF SUMMARY OF THE INVENTION

The primary objective of the present invention is to provide a regulating switch that satisfies multiple regulating requirements.

In accordance with the present invention, there is provided a regulating switch comprising a first regulating rod, a second regulating rod, a base, a partition board, multiple first elastic plates, multiple second elastic plates, a first variable resistor, and a second variable resistor. The first regulating rod includes a first regulating portion and a first driving portion. The second regulating rod is coaxial with the first regulating rod. The second regulating rod includes a second regulating portion and a second driving portion. The first regulating rod extends through the second regulating rod. The first regulating portion protrudes from the second regulating portion. The first driving portion protrudes from the second driving portion. The partition board is mounted in the base. The partition board divides the base into a first space and a second space. The partition board has a center provided with a first through hole. The base is provided with a second through hole. The second through hole is close to the first regulating portion. The first driving portion extends through the second through hole and the first through hole and extends into the first space. The second driving portion extends through the second through hole and extends into the second space. The first variable resistor is connected with the first driving portion. The second variable resistor is connected with the second driving portion. The first elastic plates are mounted in the first space and electrically connected to an outside. The first elastic plates rest on the first driving portion and/or rest on the first variable resistor. The second elastic plates are mounted in the second space and electrically connected to the outside. The second elastic plates rest on the second driving portion and/or rest on the second variable resistor.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
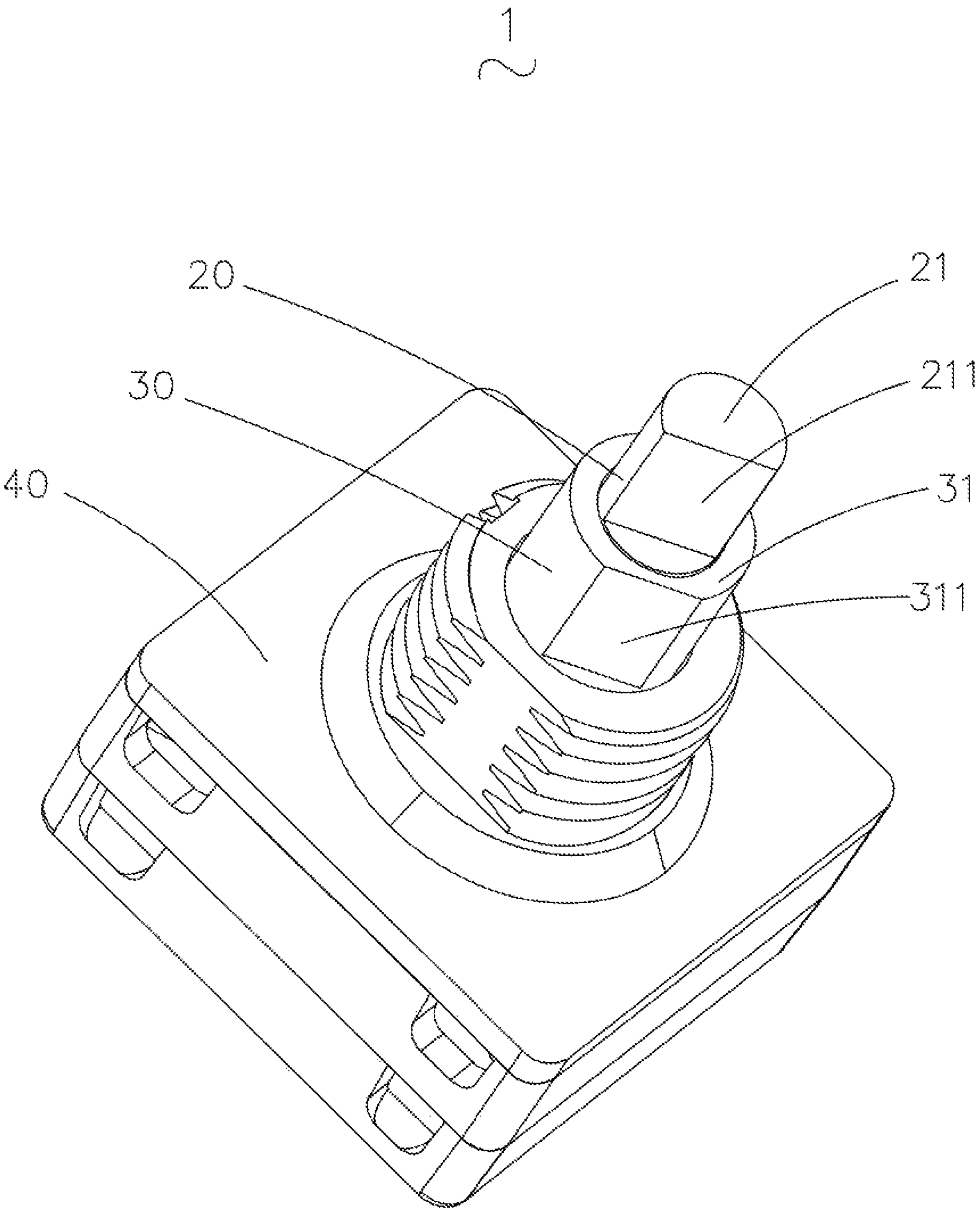
FIG. 1 is a perspective view of a regulating switch in accordance with the preferred embodiment of the present invention.
Figure 2:
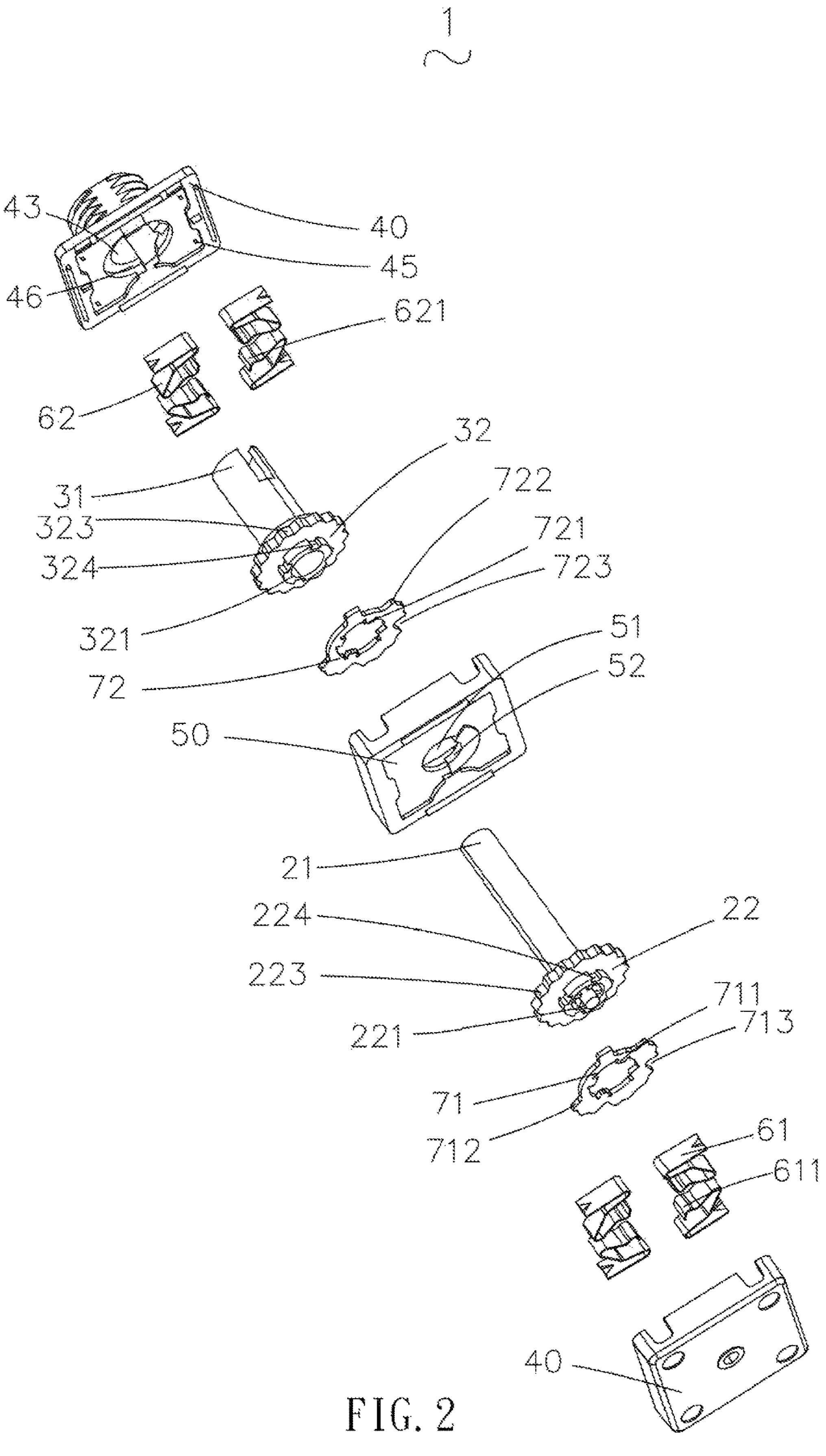
FIG. 2 is an exploded perspective view of the regulating switch in accordance with the preferred embodiment of the present invention.
Figure 3:
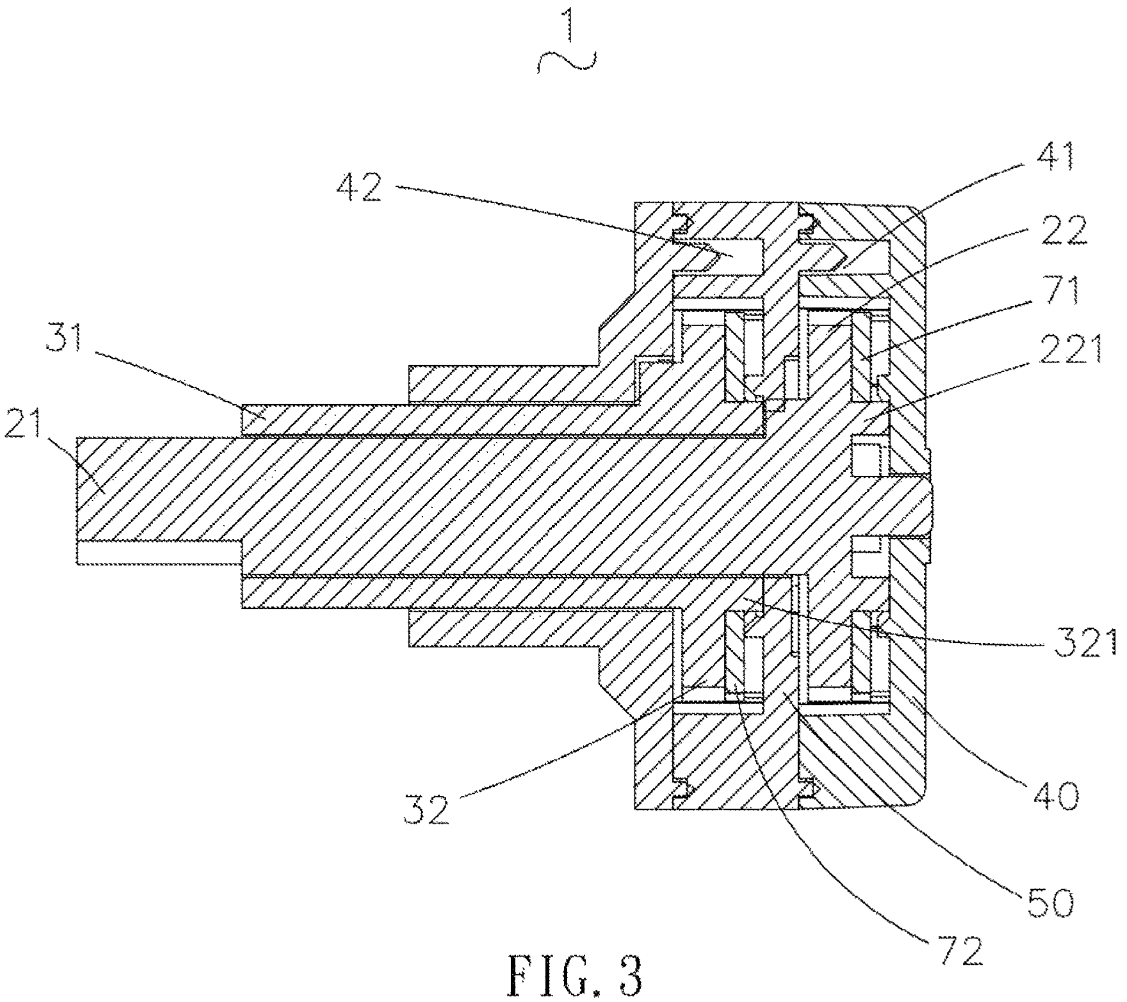
FIG. 3 is a cross-sectional view of the regulating switch in accordance with the preferred embodiment of the present invention.
Figure 4:
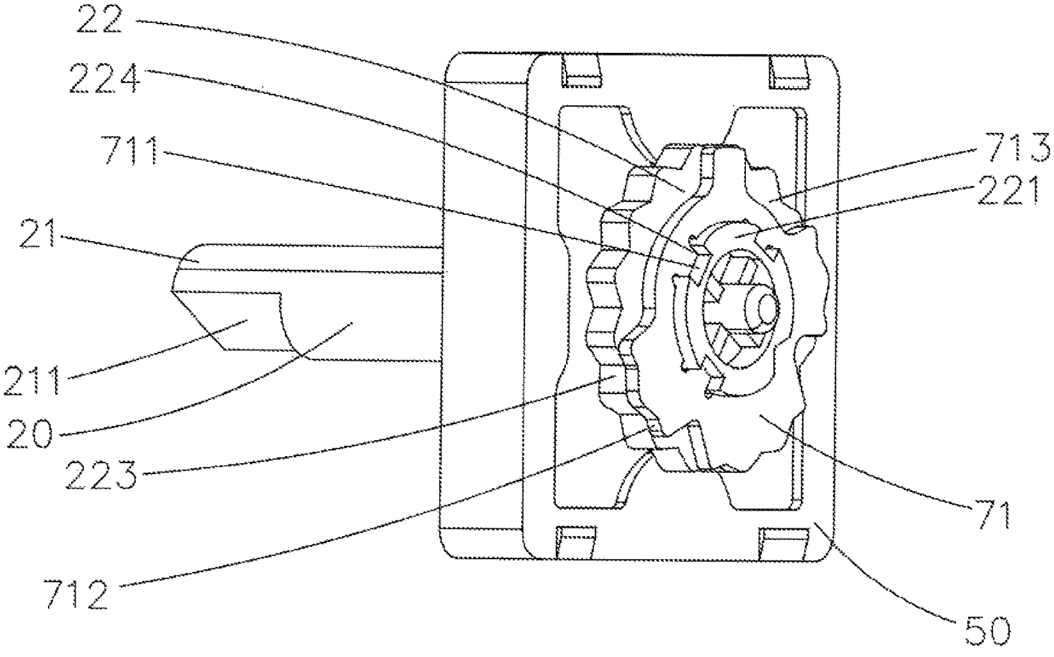
FIG. 4 is a partial perspective view of the regulating switch in accordance with the preferred embodiment of the present invention.
Figure 5:
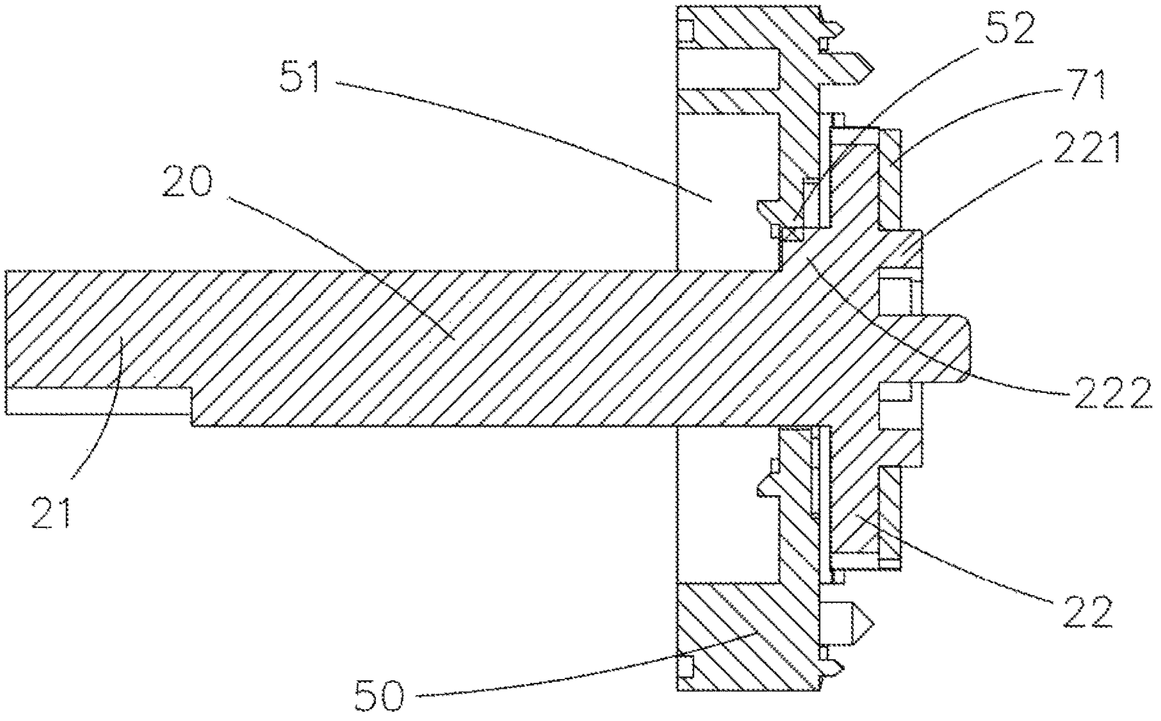
FIG. 5 is a cross-sectional view of the regulating switch as shown in FIG. 4.
Figure 6:
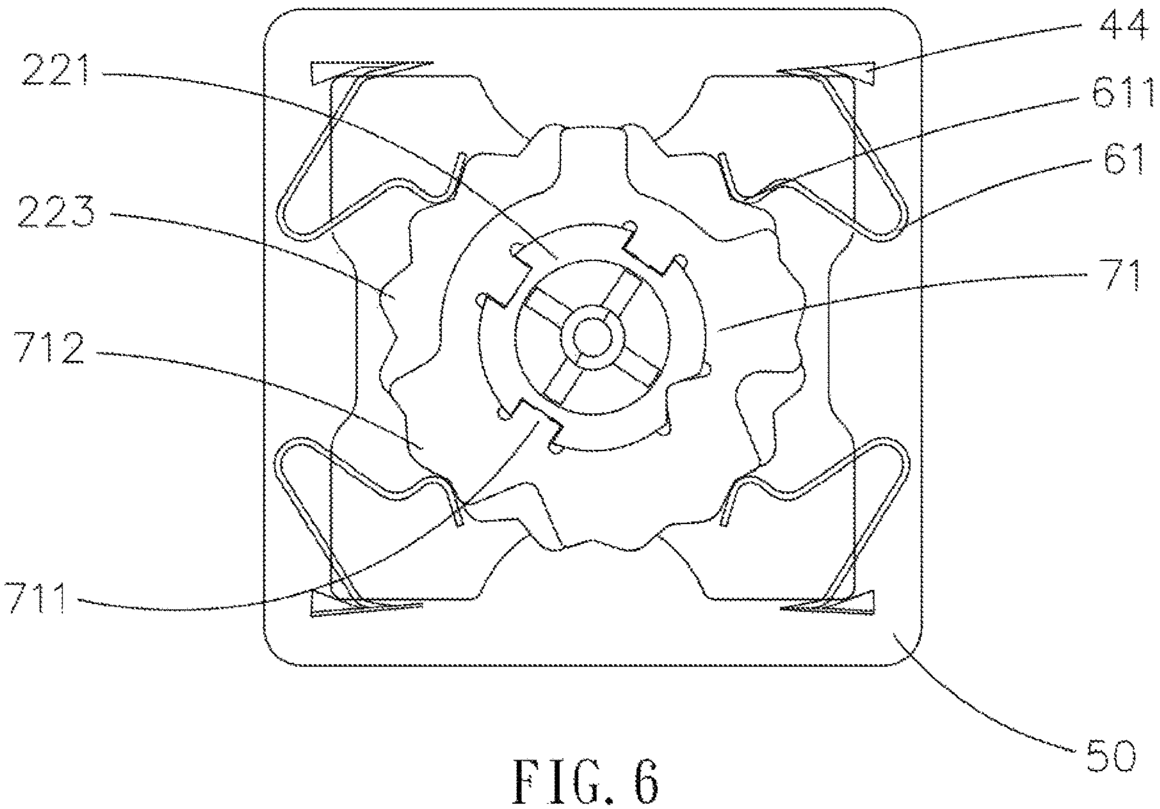
FIG. 6 is a partial side view of the regulating switch in accordance with the preferred embodiment of the present invention.
Figure 7:
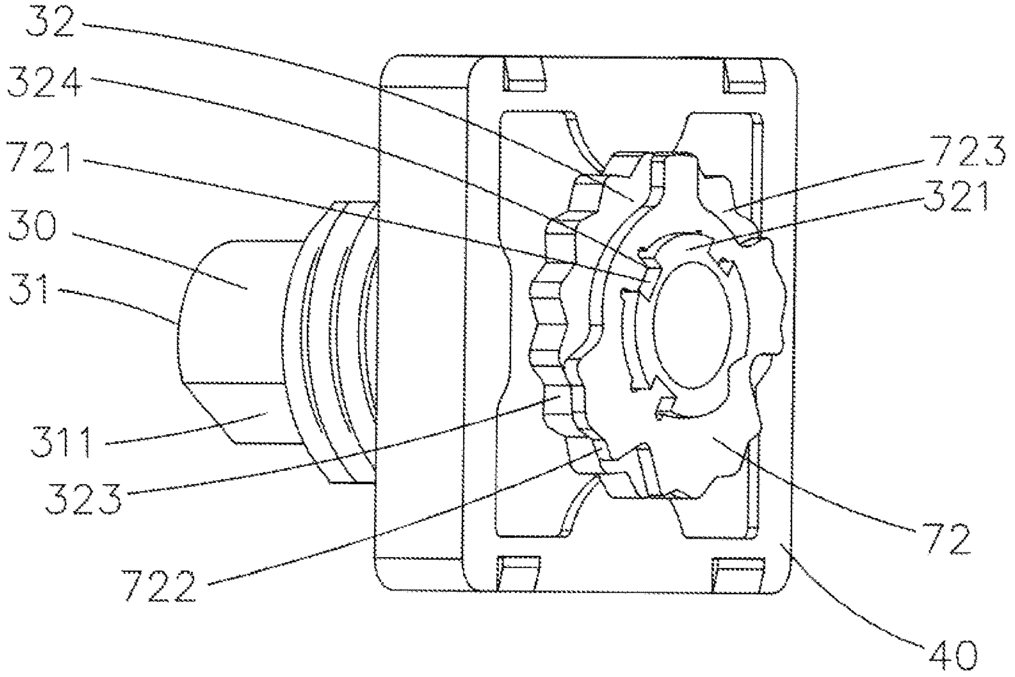
FIG. 7 is a partial perspective view of the regulating switch in accordance with the preferred embodiment of the present invention.
Figure 8:
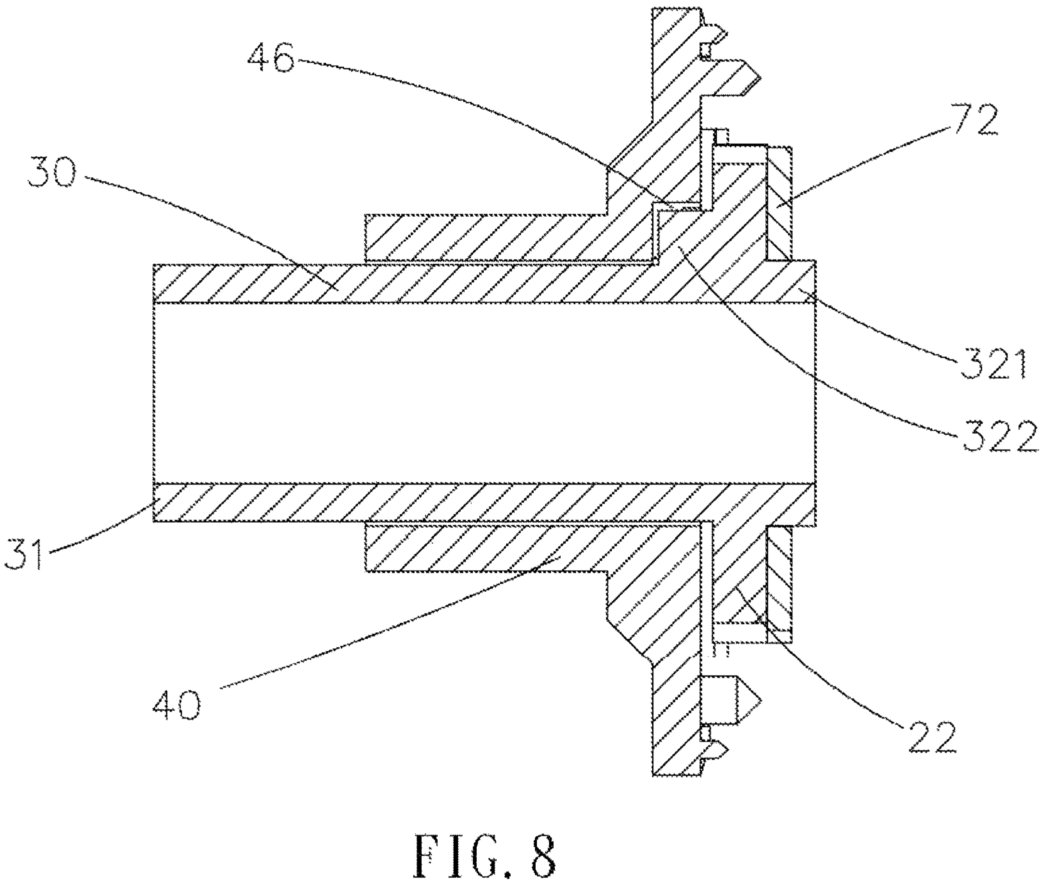
FIG. 8 is a cross-sectional view of the regulating switch as shown in FIG. 7.
Figure 9:
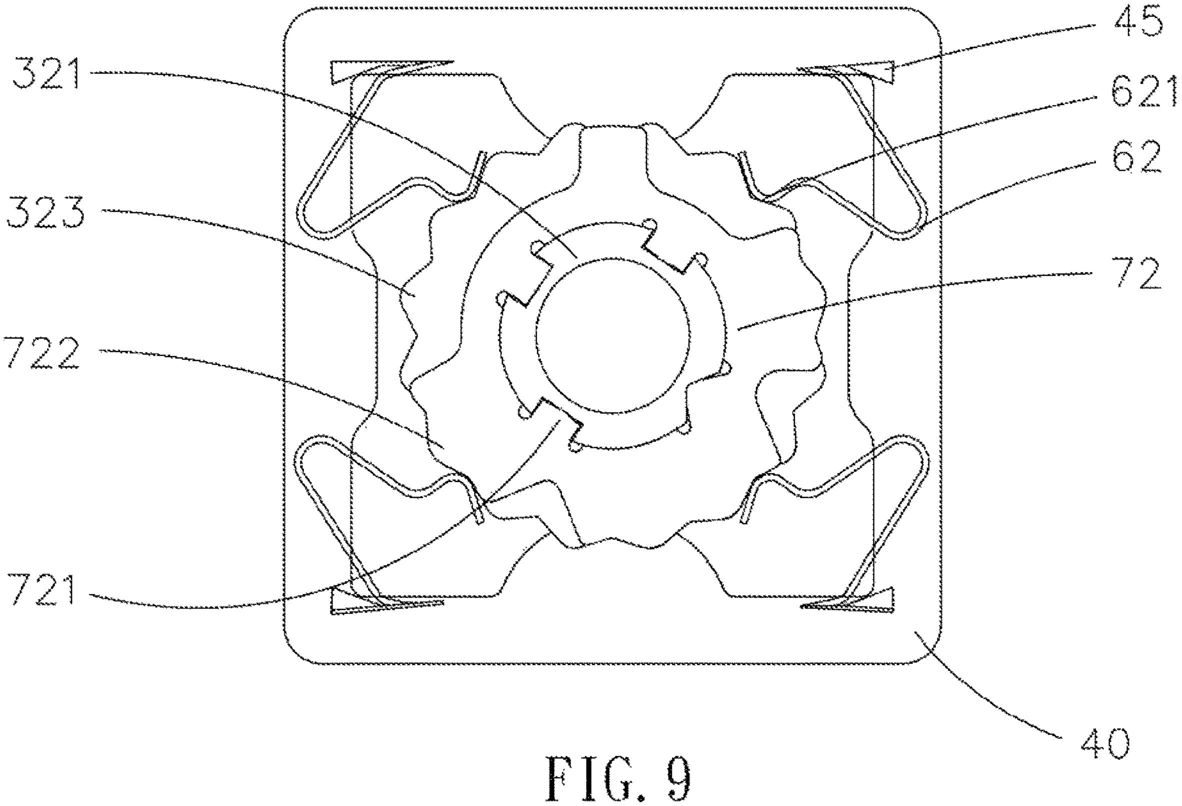
FIG. 9 is a partial side view of the regulating switch in accordance with the preferred embodiment of the present invention.

Referring to the drawings and initially to FIGS. 1-9, a regulating switch 1 in accordance with the preferred embodiment of the present invention comprises a first regulating (or adjusting) rod (or pole or handle) 20, a second regulating (or adjusting) rod (or pole or handle) 30, a base 40, a partition (or baffle or division) board 50, multiple first elastic plates 61, multiple second elastic plates 62, a first variable (or adjustable) resistor 71, and a second variable (or adjustable) resistor 72. The first regulating rod 20 includes a first regulating (or adjusting) portion 21 and a first driving portion 22. The second regulating rod 30 is coaxial with the first regulating rod 20. The second regulating rod 30 includes a second regulating (or adjusting) portion 31 and a second driving portion 32. The first regulating rod 20 extends through the second regulating rod 30. The first regulating portion 21 protrudes from the second regulating portion 31. The first driving portion 22 protrudes from the second driving portion 32. The partition board 50 is mounted in the base 40. The partition board 50 divides the base 40 into a first space 41 and a second space 42 as shown in FIG. 3. The partition board 50 has a center provided with a first through hole 51. The base 40 is provided with a second through hole 43. The second through hole 43 is close to the first regulating portion 21. The first driving portion 22 extends through the second through hole 43 and the first through hole 51 and extends into the first space 41. The second driving portion 32 extends through the second through hole 43 and extends into the second space 42. The first variable resistor 71 is connected with the first driving portion 22. The second variable resistor 72 is connected with the second driving portion 32. The first elastic plates 61 are mounted in the first space 41 and electrically connected to an outside. The first elastic plates 61 rest on the first driving portion 22 and/or rest on the first variable resistor 71. The second elastic plates 62 are mounted in the second space 42 and electrically connected to the outside. The second elastic plates 62 rest on the second driving portion 32 and/or rest on the second variable resistor 72.

In practice, when the first regulating portion 21 is rotated, the first driving portion 22 is rotated in concert with the first regulating portion 21, and the first variable resistor 71 is driven and rotated by the first driving portion 22. In addition, when the second regulating portion 31 is rotated, the second driving portion 32 is rotated in concert with the second regulating portion 31, and the second variable resistor 72 is driven and rotated by the second driving portion 32. Thus, when the first driving portion 22 is rotated to different positions, the first elastic plates 61 rest on the first driving portion 22 and the first variable resistor 71 simultaneously or only rest on the first driving portion 22 without touching the first variable resistor 71. In addition, when the second driving portion 32 is rotated to different positions, the second elastic plates 62 rest on the second driving portion 32 and the second variable resistor 72 simultaneously or only rest on the second driving portion 32 without touching the second variable resistor 72.

In such a manner, different contact positions of the first variable resistor 71 have different resistance, and different contact positions of the second variable resistor 72 have different resistance, so that the connected circuit has different resistance to perform a regulating or adjusting function.

By the above-mentioned arrangement, the first regulating rod 20 and the second regulating rod 30 are coaxial and can be driven individually. When the first driving portion 22 drives and rotates the first variable resistor 71, the first elastic plates 61 rest on the first driving portion 22 and the first variable resistor 71 simultaneously or only rest on the first driving portion 22, and when the second driving portion 32 drives and rotates the second variable resistor 72, the second elastic plates 62 rest on the second driving portion 32 and the second variable resistor 72 simultaneously or only rest on the second driving portion 32. When the first variable resistor 71 and the first elastic plates 61 have different contact positions, the contact resistance is different, and when the second variable resistor 72 and the second elastic plates 62 have different contact positions, the contact resistance is also different. If the first elastic plates 61 only rest on the first driving portion 22, and the second elastic plates 62 only rest on the second driving portion 32, the regulating switch 1 is turned off. Thus, the user only needs to rotate the first regulating portion 21 and the second regulating portion 31 to change the resistance of the circuit so as to perform a regulating function. Therefore, the coaxial arrangement of the first regulating rod 20 and the second regulating rod 30 can integrate multiple regulating functions to simplify the structure of the regulating switch 1, so that the regulating switch 1 is operated easily and conveniently.

In the preferred embodiment of the present invention, the first driving portion 22 is provided with a first locking member 221. The first locking member 221 is distant from the first through hole 51. The first locking member 221 is provided with multiple first locking grooves 224. The first locking grooves 224 are perpendicular to an axial direction of the first driving portion 22. The first variable resistor 71 is provided with multiple first locking blocks 711 fitted into the first locking grooves 224. The first locking blocks 711 are perpendicular to an axial direction of the first variable resistor 71.

In such a manner, the first locking blocks 711 are locked in the first locking grooves 224 so that the first variable resistor 71 and the first driving portion 22 are locked tightly to prevent the first variable resistor 71 and the first driving portion 22 from slipping during rotation.

By the above-mentioned arrangement, the first variable resistor 71 is locked on the first driving portion 22 firmly so that the first variable resistor 71 and the first driving portion 22 are combined closely and tightly. Thus, the first driving portion 22 provides a better transmission to the first variable resistor 71.

Alternatively, the first locking grooves 224 are directly provided on the first driving portion 22, while the first locking member 221 and the first locking blocks 711 are provided on the first variable resistor 71.

In the preferred embodiment of the present invention, the first through hole 51 has an inner wall provided with a second locking block 52. The first driving portion 22 is provided with a third locking block 222 (see FIG. 5) aligning with the second locking block 52. The third locking block 222 is close to the first through hole 51. When the first regulating rod 20 is rotated relative to the partition board 50, the third locking block 222 is rotated and moved to abut the second locking block 52.

In such a manner, a determined distance is defined between the third locking block 222 and the second locking block 52. When the first driving portion 22 is rotated through a determined angle, the third locking block 222 will touch the second locking block 52, so that the first driving portion 22 is limited to rotate in a predetermined angle and cannot be rotated through a complete cycle, and the regulating switch 1 is regulated precisely.

By the above-mentioned arrangement, the first regulating rod 20 is limited to rotate in a predetermined angle and cannot be rotated through a complete cycle, so that the first regulating rod 20 is limited in a preset range of rotation.

In the preferred embodiment of the present invention, the first driving portion 22 is provided with a first locking toothed portion 223. The first locking toothed portion 223 is parallel with an axial direction of the first regulating rod 20. The first variable resistor 71 has a periphery provided with at least two second locking toothed portions 712. The at least two second locking toothed portions 712 are parallel with the axial direction of the first regulating rod 20. The first variable resistor 71 is provided with multiple first recesses 713 defined between the at least two second locking toothed portions 712. Each of the first elastic plates 61 has a first end provided with a first limit portion 611 abutting the first driving portion 22 and the first variable resistor 71. The first limit portion 611 of each of the first elastic plates 61 rests on the first locking toothed portion 223 and each of the at least two second locking toothed portions 712. When each of the first recesses 713 is rotated to align with the first limit portion 611 of each of the first elastic plates 61, the first limit portion 611 of each of the first elastic plates 61 only rests on the first locking toothed portion 223.

In such a manner, when the first driving portion 22 is rotated through a determined angle, each of the first recesses 713 aligns with the first limit portion 611 of each of the first elastic plates 61, so that the first limit portion 611 of each of the first elastic plates 61 only rests on the first locking toothed portion 223, without touching each of the at least two second locking toothed portions 712. At this time, the first driving portion 22 is an insulator. Thus, the circuit is interrupted so that the regulating switch 1 is turned off.

By the above-mentioned arrangement, by regulating the first regulating rod 20, the first limit portion 611 of each of the first elastic plates 61 rests on the first locking toothed portion 223 and each of the at least two second locking toothed portions 712 or only rests on the first locking toothed portion 223, to perform a regulating function at different states, so that the regulating switch 1 is regulated precisely.

In the preferred embodiment of the present invention, the first limit portion 611 of each of the first elastic plates 61 has a curved shape matching that of the first locking toothed portion 223 and that of each of the at least two second locking toothed portions 712. The partition board 50 is provided with multiple first limit pieces 44 (see FIG. 6). Each of the first elastic plates 61 has a second end distant from the first limit portion 611 and abutting each of the first limit pieces 44.

In such a manner, the first limit portion 611 of each of the first elastic plates 61 has a curved shape and a curvature matching that of the first locking toothed portion 223 and that of each of the at least two second locking toothed portions 712, so that the first locking toothed portion 223 and each of the at least two second locking toothed portions 712 exactly contact the first limit portion 611 of each of the first elastic plates 61 during rotation in the clockwise direction and in the counterclockwise direction. Thus, the first driving portion 22 and the first variable resistor 71 are rotated smoothly relative to the first elastic plates 61 without jamming therebetween.

By the above-mentioned arrangement, the first limit portion 611 of each of the first elastic plates 61 exactly fits the first locking toothed portion 223 and each of the at least two second locking toothed portions 712, so that when the first locking toothed portion 223 and each of the at least two second locking toothed portions 712 are rotated in the clockwise or counterclockwise direction, the first locking toothed portion 223 and each of the at least two second locking toothed portions 712 exactly contact the first limit portion 611 of each of the first elastic plates 61. Thus, the first elastic plates 61 are secured firmly without loosening.

In the preferred embodiment of the present invention, the second driving portion 32 is provided with a second locking member 321. The second locking member 321 is distant from the second through hole 43. The second locking member 321 is provided with multiple second locking grooves 324. The second locking grooves 324 are perpendicular to an axial direction of the second driving portion 32. The second variable resistor 72 is provided with multiple fourth locking blocks 721 fitted into the second locking grooves 324. The fourth locking blocks 721 are perpendicular to an axial direction of the second variable resistor 72.

In such a manner, the fourth locking blocks 721 are locked in the second locking grooves 324 so that the second variable resistor 72 and the second driving portion 32 are locked tightly to prevent the second variable resistor 72 and the second driving portion 32 from slipping during rotation.

By the above-mentioned arrangement, the second variable resistor 72 is locked on the second driving portion 32 firmly so that the second variable resistor 72 and the second driving portion 32 are combined closely and tightly. Thus, the second driving portion 32 provides a better transmission to the second variable resistor 72.

Alternatively, the second locking grooves 324 are directly provided on the second driving portion 32, while the second locking member 321 and the fourth locking blocks 721 are provided on the second variable resistor 72.

In the preferred embodiment of the present invention, the second through hole 43 has an inner wall provided with a fifth locking block 46. The second driving portion 32 is provided with a sixth locking block 322 (see FIG. 8) aligning with the fifth locking block 46. The sixth locking block 322 is close to the second through hole 43. When the second regulating rod 30 is rotated relative to the base 40, the sixth locking block 322 is rotated and moved to abut the fifth locking block 46.

In such a manner, a determined distance is defined between the sixth locking block 322 and the fifth locking block 46. When the second driving portion 32 is rotated through a determined angle, the sixth locking block 322 will touch the fifth locking block 46, so that the second driving portion 32 is limited to rotate in a predetermined angle and cannot be rotated through a complete cycle, and the regulating switch 1 is regulated precisely.

By the above-mentioned arrangement, the second regulating rod 30 is limited to rotate in a predetermined angle and cannot be rotated through a complete cycle, so that the second regulating rod 30 is limited in a preset range of rotation.

In the preferred embodiment of the present invention, the second driving portion 32 is provided with a third locking toothed portion 323. The third locking toothed portion 323 is parallel with an axial direction of the second regulating rod 30. The second variable resistor 72 has a periphery provided with at least two fourth locking toothed portions 722. The at least two fourth locking toothed portions 722 are parallel with the axial direction of the second regulating rod 30. The second variable resistor 72 is provided with multiple second recesses 723 defined between the at least two fourth locking toothed portions 722. Each of the second elastic plates 62 has a first end provided with a second limit portion 621 abutting the second driving portion 32 and the second variable resistor 72. The second limit portion 621 of each of the second elastic plates 62 rests on the third locking toothed portion 323 and each of the at least two fourth locking toothed portions 722. When each of the second recesses 723 is rotated to align with the second limit portion 621 of each of the second elastic plates 62, the second limit portion 621 of each of the second elastic plates 62 only rests on the third locking toothed portion 323.

In such a manner, when the second driving portion 32 is rotated through a determined angle, each of the second recesses 723 aligns with the second limit portion 621 of each of the second elastic plates 62, so that the second limit portion 621 of each of the second elastic plates 62 only rests on the third locking toothed portion 323, without touching each of the at least two fourth locking toothed portions 722. At this time, the second driving portion 32 is an insulator. Thus, the circuit is interrupted so that the regulating switch 1 is turned off.

By the above-mentioned arrangement, by regulating the second regulating rod 30, the second limit portion 621 of each of the second elastic plates 62 rests on the third locking toothed portion 323 and each of the at least two fourth locking toothed portions 722 or only rests on the third locking toothed portion 323, to perform a regulating function at different states, so that the regulating switch 1 is regulated precisely.

In the preferred embodiment of the present invention, the second limit portion 621 of each of the second elastic plates 62 has a curved shape matching that of the third locking toothed portion 323 and that of each of the at least two fourth locking toothed portions 722. The base 40 is provided with multiple second limit pieces 45. Each of the second elastic plates 62 has a second end distant from the second limit portion 621 and abutting each of the second limit pieces 45.

In such a manner, the second limit portion 621 of each of the second elastic plates 62 has a curved shape and a curvature matching that of the third locking toothed portion 323 and that of each of the at least two fourth locking toothed portions 722, so that the third locking toothed portion 323 and each of the at least two fourth locking toothed portions 722 exactly contact the second limit portion 621 of each of the second elastic plates 62 during rotation in the clockwise direction and in the counterclockwise direction. Thus, the second driving portion 32 and the second variable resistor 72 are rotated smoothly relative to the second elastic plates 62 without jamming therebetween.

By the above-mentioned arrangement, the second limit portion 621 of each of the second elastic plates 62 exactly fits the third locking toothed portion 323 and each of the at least two fourth locking toothed portions 722, so that when the third locking toothed portion 323 and each of the at least two fourth locking toothed portions 722 are rotated in the clockwise or counterclockwise direction, the third locking toothed portion 323 and each of the at least two fourth locking toothed portions 722 exactly contact the second limit portion 621 of each of the second elastic plates 62. Thus, the second elastic plates 62 are secured firmly without loosening.

In the preferred embodiment of the present invention, the first regulating portion 21 is provided with a first cutout 211. The first cutout 211 extends in an axial direction of the first regulating portion 21. The second regulating portion 31 is provided with a second cutout 311. The second cutout 311 extends in an axial direction of the second regulating portion 31.

In such a manner, the first regulating portion 21 is operated and rotated easily by provision of the first cutout 211, to prevent the first regulating portion 21 from slipping during rotation, thereby enhancing the rotational efficiency. Similarly, the second regulating portion 31 is operated and rotated easily by provision of the second cutout 311, to prevent the second regulating portion 31 from slipping during rotation, thereby enhancing the rotational efficiency.

By the above-mentioned arrangement, the first cutout 211 and the second cutout 311 provide a firm operation face to the first regulating portion 21 and the second regulating portion 31 respectively so that the first regulating portion 21 and the second regulating portion 31 will not slip easily, thereby facilitating the user operating and regulating the first regulating portion 21 and the second regulating portion 31 precisely.

In the preferred embodiment of the present invention, the second regulating rod 30 has a hollow structure.

In the preferred embodiment of the present invention, the partition board 50 is located at a middle of the base 40.

Accordingly, the regulating switch 1 of the present invention has the following advantages.

1. The first regulating rod 20 and the second regulating rod 30 are coaxial and can be driven individually. When the first driving portion 22 drives and rotates the first variable resistor 71, the first elastic plates 61 rest on the first driving portion 22 and the first variable resistor 71 simultaneously or only rest on the first driving portion 22, and when the second driving portion 32 drives and rotates the second variable resistor 72, the second elastic plates 62 rest on the second driving portion 32 and the second variable resistor 72 simultaneously or only rest on the second driving portion 32. When the first variable resistor 71 and the first elastic plates 61 have different contact positions, the contact resistance is different, and when the second variable resistor 72 and the second elastic plates 62 have different contact positions, the contact resistance is also different. If the first elastic plates 61 only rest on the first driving portion 22, and the second elastic plates 62 only rest on the second driving portion 32, the regulating switch 1 is turned off. Thus, the user only needs to rotate the first regulating portion 21 and the second regulating portion 31 to change the resistance of the circuit so as to perform a regulating function. Therefore, the coaxial arrangement of the first regulating rod 20 and the second regulating rod 30 can integrate multiple regulating functions to simplify the structure of the regulating switch 1, so that the regulating switch 1 is operated easily and conveniently.
2. The first variable resistor 71 is locked on the first driving portion 22 firmly so that the first variable resistor 71 and the first driving portion 22 are combined closely and tightly. Thus, the first driving portion 22 provides a better transmission to the first variable resistor 71.
3. The first regulating rod 20 is limited to rotate in a predetermined angle and cannot be rotated through a complete cycle, so that the first regulating rod 20 is limited in a preset range of rotation.
4. By regulating the first regulating rod 20, the first limit portion 611 of each of the first elastic plates 61 rests on the first locking toothed portion 223 and each of the at least two second locking toothed portions 712 or only rests on the first locking toothed portion 223, to perform a regulating function at different states, so that the regulating switch 1 is regulated precisely.
5. The first limit portion 611 of each of the first elastic plates 61 exactly fits the first locking toothed portion 223 and each of the at least two second locking toothed portions 712, so that when the first locking toothed portion 223 and each of the at least two second locking toothed portions 712 are rotated in the clockwise or counterclockwise direction, the first locking toothed portion 223 and each of the at least two second locking toothed portions 712 exactly contact the first limit portion 611 of each of the first elastic plates 61. Thus, the first elastic plates 61 are secured firmly without loosening.
6. The second variable resistor 72 is locked on the second driving portion 32 firmly so that the second variable resistor 72 and the second driving portion 32 are combined closely and tightly. Thus, the second driving portion 32 provides a better transmission to the second variable resistor 72.
7. The second regulating rod 30 is limited to rotate in a predetermined angle and cannot be rotated through a complete cycle, so that the second regulating rod 30 is limited in a preset range of rotation.
8. By regulating the second regulating rod 30, the second limit portion 621 of each of the second elastic plates 62 rests on the third locking toothed portion 323 and each of the at least two fourth locking toothed portions 722 or only rests on the third locking toothed portion 323, to perform a regulating function at different states, so that the regulating switch 1 is regulated precisely.
9. The second limit portion 621 of each of the second elastic plates 62 exactly fits the third locking toothed portion 323 and each of the at least two fourth locking toothed portions 722, so that when the third locking toothed portion 323 and each of the at least two fourth locking toothed portions 722 are rotated in the clockwise or counterclockwise direction, the third locking toothed portion 323 and each of the at least two fourth locking toothed portions 722 exactly contact the second limit portion 621 of each of the second elastic plates 62. Thus, the second elastic plates 62 are secured firmly without loosening.

10. The first cutout 211 and the second cutout 311 provide a firm operation face to the first regulating portion 21 and the second regulating portion 31 respectively so that the first regulating portion 21 and the second regulating portion 31 will not slip easily, thereby facilitating the user operating and regulating the first regulating portion 21 and the second regulating portion 31 precisely.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A regulating switch comprising:

a first regulating rod, a second regulating rod, a base, a partition board, multiple first elastic plates, multiple second elastic plates, a first variable resistor, and a second variable resistor;

wherein:

the first regulating rod includes a first regulating portion and a first driving portion;

the second regulating rod is coaxial with the first regulating rod;

the second regulating rod includes a second regulating portion and a second driving portion;

the first regulating rod extends through the second regulating rod;

the first regulating portion protrudes from the second regulating portion;

the first driving portion protrudes from the second driving portion;

the partition board is mounted in the base;

the partition board divides the base into a first space and a second space;

the partition board has a center provided with a first through hole;

the base is provided with a second through hole;

the first regulating portion extends through the second through hole and the first through hole and extends into the first space;

the second regulating portion extends through the second through hole and extends into the second space;

the first variable resistor is connected with the first driving portion;

the second variable resistor is connected with the second driving portion;

the first elastic plates are mounted in the first space and electrically connected to an outside;

the first elastic plates rest on the first driving portion and/or rest on the first variable resistor;

the second elastic plates are mounted in the second space and electrically connected to the outside; and the second elastic plates rest on the second driving portion and/or rest on the second variable resistor.

2. The regulating switch as claimed in claim 1, wherein:

the first driving portion is provided with a first locking member;

the first locking member is distant from the first through hole;

the first locking member is provided with multiple first locking grooves;

the first locking grooves are perpendicular to an axial direction of the first driving portion;

the first variable resistor is provided with multiple first locking blocks fitted into the first locking grooves; and the first locking blocks are perpendicular to an axial direction of the first variable resistor.

3. The regulating switch as claimed in claim 1, wherein:

the first through hole has an inner wall provided with a second locking block;

the first driving portion is provided with a third locking block aligning with the second locking block; and when the first regulating rod is rotated relative to the partition board, the third locking block is rotated and moved to abut the second locking block.

4. The regulating switch as claimed in claim 1, wherein:

the second driving portion is provided with a second locking member;

the second locking member is distant from the second through hole;

the second locking member is provided with multiple second locking grooves;

the second locking grooves are perpendicular to an axial direction of the second driving portion;

the second variable resistor is provided with multiple fourth locking blocks fitted into the second locking grooves; and the fourth locking blocks are perpendicular to an axial direction of the second variable resistor.

5. The regulating switch as claimed in claim 1, wherein:

the second through hole has an inner wall provided with a fifth locking block;

the second driving portion is provided with a sixth locking block aligning with the fifth locking block; and when the second regulating rod is rotated relative to the base, the sixth locking block is rotated and moved to abut the fifth locking block.

6. The regulating switch as claimed in claim 1, wherein:

the first regulating portion is provided with a first cutout;

the first cutout extends in an axial direction of the first regulating portion;

the second regulating portion is provided with a second cutout; and the second cutout extends in an axial direction of the second regulating portion.

7. The regulating switch as claimed in claim 1, wherein:

the first driving portion is provided with a first locking toothed portion;

the first locking toothed portion is parallel with an axial direction of the first regulating rod;

the first variable resistor has a periphery provided with at least two second locking toothed portions;

the at least two second locking toothed portions are parallel with the axial direction of the first regulating rod;

the first variable resistor is provided with multiple first recesses defined between the at least two second locking toothed portions;

each of the first elastic plates has a first end provided with a first limit portion abutting the first driving portion and the first variable resistor;

the first limit portion of each of the first elastic plates rests on the first locking toothed portion and each of the at least two second locking toothed portions; and when each of the first recesses is rotated to align with the first limit portion of each of the first elastic plates, the first limit portion of each of the first elastic plates only rests on the first locking toothed portion.

8. The regulating switch as claimed in claim 7, wherein:

the first limit portion of each of the first elastic plates has a curved shape matching that of the first locking toothed portion and that of each of the at least two second locking toothed portions;

the partition board is provided with multiple first limit pieces; and each of the first elastic plates has a second end distant from the first limit portion and abutting each of the first limit pieces.

9. The regulating switch as claimed in claim 1, wherein:

the second driving portion is provided with a third locking toothed portion;

the third locking toothed portion is parallel with an axial direction of the second regulating rod;

the second variable resistor has a periphery provided with at least two fourth locking toothed portions;

the at least two fourth locking toothed portions are parallel with the axial direction of the second regulating rod;

the second variable resistor is provided with multiple second recesses defined between the at least two fourth locking toothed portions;

each of the second elastic plates has a first end provided with a second limit portion abutting the second driving portion and the second variable resistor;

the second limit portion of each of the second elastic plates rests on the third locking toothed portion and each of the at least two fourth locking toothed portions; and when each of the second recesses is rotated to align with the second limit portion of each of the second elastic plates, the second limit portion of each of the second elastic plates only rests on the third locking toothed portion.

10. The regulating switch as claimed in claim 9, wherein:

the second limit portion of each of the second elastic plates has a curved shape matching that of the third locking toothed portion and that of each of the at least two fourth locking toothed portions;

the base is provided with multiple second limit pieces; and each of the second elastic plates has a second end distant from the second limit portion and abutting each of the second limit pieces.

* * * * *